United States Patent
Fujimoto et al.

(10) Patent No.: US 10,104,108 B2
(45) Date of Patent: Oct. 16, 2018

(54) LOG ANALYSIS SYSTEM

(71) Applicant: LAC CO., LTD., Chiyoda-ku, Tokyo (JP)

(72) Inventors: Hiroshi Fujimoto, Tokyo (JP); Toshihide Nakama, Tokyo (JP)

(73) Assignee: LAC CO., LTD., Tokyo (JP)

( * ) Notice: Subject to any disclaimer, the term of this patent is extended or adjusted under 35 U.S.C. 154(b) by 143 days.

(21) Appl. No.: 15/072,694

(22) Filed: Mar. 17, 2016

(65) Prior Publication Data

US 2016/0197952 A1 Jul. 7, 2016

Related U.S. Application Data

(63) Continuation of application No. PCT/JP2015/055618, filed on Feb. 26, 2015.

(30) Foreign Application Priority Data

Mar. 31, 2014 (JP) .................................. 2014-074607

(51) Int. Cl.
*H04L 29/06* (2006.01)
*G06F 21/55* (2013.01)
(Continued)

(52) U.S. Cl.
CPC ........ *H04L 63/1425* (2013.01); *G06F 21/552* (2013.01); *H04L 12/6418* (2013.01); *H04L 63/1416* (2013.01)

(58) Field of Classification Search
CPC ............. H04L 63/1425; H04L 63/1408; H04L 63/1416; H04L 63/14; G06F 21/566; G06F 21/55; G06F 21/554
See application file for complete search history.

(56) References Cited

U.S. PATENT DOCUMENTS 7,891,001 B1 * 2/2011 Greenawalt ............. H04L 63/20
                                              713/151
9,720,918 B2 * 8/2017 Smith ................. G06F 17/3007
(Continued)

FOREIGN PATENT DOCUMENTS

WO     2005/107424     11/2005

OTHER PUBLICATIONS

Office Action issued in Canada Patent Appl. No. 2942529, dated Jul. 5, 2017.

*Primary Examiner* — Tae K Kim
(74) *Attorney, Agent, or Firm* — Greenblum & Bernstein, P.L.C.

(57) ABSTRACT

A log analysis system for analyze a detection log detected in a monitoring target system includes an acquisition device for detecting detection target processes performed in the monitoring target system, and acquiring a detection log of the detection target processes; and a processor device for processing the detection log acquired by the acquirer. The processor device includes a plurality of processing blocks that perform processing on the detection log sequentially. The processor device performs processing while sending the detection log in order from a most-upstream processing block to downstream processing blocks. A most-downstream processing block of the processor device notifies the most-upstream processing block of the processor device that the detection log has been received. For a detection log being processed that cannot be confirmed to have arrived at the most-downstream processing block, the most-upstream processing block of the processor device resends the detection log to a downstream processing block.

4 Claims, 11 Drawing Sheets

(51) Int. Cl.
*G06F 21/56* (2013.01)
*H04L 12/64* (2006.01)

(56) References Cited

U.S. PATENT DOCUMENTS

| | | | | |
|---|---|---|---|---|
| 2004/0093254 | A1* | 5/2004 | Hirata | G06F 11/3409 709/224 |
| 2005/0114505 | A1* | 5/2005 | DeStefano | G06F 17/2705 709/224 |
| 2005/0114706 | A1* | 5/2005 | DeStefano | H04L 63/1425 726/4 |
| 2005/0114707 | A1* | 5/2005 | DeStefano | H04L 63/1416 726/4 |
| 2005/0114708 | A1* | 5/2005 | DeStefano | H04L 63/1425 726/4 |
| 2005/0278706 | A1* | 12/2005 | Garza | G06F 11/3636 717/128 |
| 2008/0262990 | A1* | 10/2008 | Kapoor | G06F 9/505 706/20 |
| 2009/0251731 | A1* | 10/2009 | Kobayashi | G06F 11/3476 358/1.15 |
| 2012/0240185 | A1* | 9/2012 | Kapoor | H04L 63/1425 726/1 |
| 2013/0013838 | A1* | 1/2013 | Sakamoto | G06F 15/8015 710/305 |

* cited by examiner

LOG ANALYSIS SYSTEM

CLAIM FOR PRIORITY

This application is a Continuation of PCT/JP2015/055618 filed Feb. 26, 2015, the contents of which is expressly incorporated by reference herein in its entirety.

TECHNICAL FIELD

The present invention relates to a log analysis system for acquiring and analyzing logs generated in a target system.

The present application claims priority based on Japanese patent application number JP 2014-074607 filed on 31 Mar. 2014, the contents of which are incorporated herein by reference.

BACKGROUND

A large volume of data communication and processing occurs in a variety of information systems utilizing an information communication network such as the Internet (hereinafter referred to simply as "network"). Problems may develop, however, such as unauthorized access of a server or equipment such as various terminal devices operating on a network, unauthorized information leaks from a server, or the like.

For instance, it is preferable to monitor data communications in real time in order to suppress damage due to unauthorized communications without needing to investigate a communication lot after the fact. Conventional techniques for doing so have been disclosed. For example, JP 2007-536646 discloses collecting security events from various monitoring devices, storing security events, providing a subset of the stored security events to a manager as an event stream, and having the manager discover one or more unknown event patterns in the event stream.

Conventionally, corresponding processing may be performed by monitoring communications on a server on a network, and detecting unauthorized access or the sending and receiving of data. Monitoring may be performed at a central location when multiple servers are taken as targets to be monitored.

Patent Document 1: JP 2007-536646

SUMMARY

When analyzing a large volume of logs and performing information processing to extract processes having a specific quality (such as a problematic communications) in order to perform information communication monitoring and the like on the network described above, the amount of data in logs acquired as analysis targets is normally huge. However, there may be only a small number of processes having a specific quality that need to be extracted, and there may be only a few logs where such processing may need to be performed. Accordingly, appropriately narrowing down targets to be analyzed and performing analysis with good efficiency is needed in a wide variety of information processing fields regardless of whether communications are being inspected.

An objective of the present invention is to provide a log analysis system capable of narrowing down logs for analysis and performing log analysis with good efficiency.

In order to achieve the objective, a log analysis system relating to an embodiment of the present invention may analyze a detection log detected in a monitoring target system. The log analysis system may be provided with: an acquisition device for detecting detection target processes performed in the monitoring target system, and acquiring a detection log of the detection target processes; and a processor device for processing the detection log acquired by the acquirer. The processor device includes multiple processing blocks that perform processing on the detection log sequentially. The processor device performs processing while sending the detection log in order from a lead processing block to downstream processing blocks. A most-downstream processing block of the processor device notifies a most-upstream processing block of the processor device that the detection log has been received. For a detection log being processed that cannot be confirmed to have arrived at the most-downstream processing block in a notification received from the most-downstream processing block of the processor device, the most-upstream processing block of the processor device resends the detection log to a downstream processing block.

In the log analysis system described above, the most-upstream processing block of the processor device may stop sending a detection log for cases where, after having repeatedly sent the detection log a predefined number of times, it cannot be confirmed in a notification from the most-downstream processing block of the processor device that the detection log has arrived at the most-downstream processing block.

In the log analysis system described above, the most-upstream processing block of the processor device may also add information to a detection log, the information capable of being used to identify whether or not the detection log has been resent.

In the log analysis system described above, the most-upstream processing block of the processor device may also add information to a detection log, the information showing how many times the detection log has been transmitted.

Embodiments of the present invention may also be achieved by controlling a computer to implement device functions described above as a program. The program may be provided by being distributed stored on a magnetic disk, an optical disk, a semiconductor memory, or other recording medium, and may also be provided by being distributed through a network.

According to the present invention, targets can be narrowed down and analysis can be performed with good efficiency during log analysis.

DETAILED DESCRIPTION

Embodiments of the present invention are explained below with reference to the drawings.

A log analysis system of the present embodiment for acquiring and analyzing a detection target processing log ("detection log") from an investigation target system is explained below taking a case of applying the log analysis system to a security monitoring system that monitors communications on a network, and acquires and analyzes a communication log as a detection log. A security monitoring system (Security Operation Center, "SOC") of the present embodiment monitors communications of an information processing device that is a device subject to monitoring, and extracts communications having a problem such as unauthorized external access, unauthorized internal information leaks, or the like as one target of a detection target process having an extraction necessary specific quality.

Example of System Configuration

Figure 1:
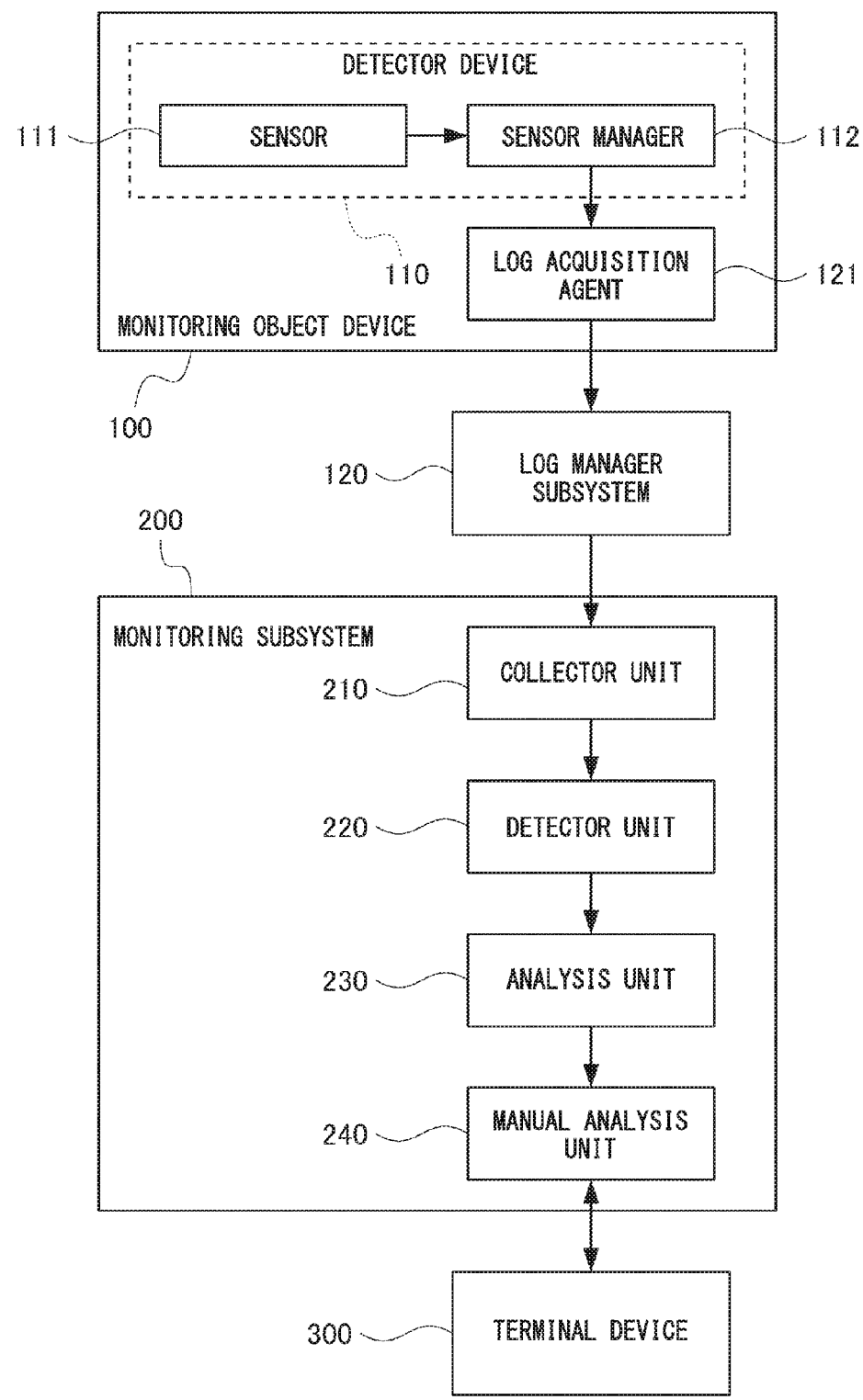
FIG. 1 is a diagram illustrating an example of the configuration of a security monitoring system of the present embodiment.

FIG. 1 is a diagram illustrating an example of the configuration of a security monitoring system of the present embodiment.

As FIG. 1 illustrates, a security monitoring system according to the present embodiment includes a detector device 110 as an acquisition device for monitoring communications in a monitoring target device 100 and acquiring a communication log, log acquisition agent 121, and logs manager subsystem 120. The security monitoring system according to the present embodiment is also provided with a monitoring subsystem 200 as a processor device for processing acquired communication logs and extracting problematic communications. In addition, the security monitoring system according to the present embodiment is also provided with a terminal device 300 as an output device for outputting results of processing by the monitoring subsystem 200. In the configuration illustrated in FIG. 1, the detector device 110 and the log acquisition agent 121 installed in the monitoring target device 100 are separated from the log manager subsystem 120, the monitoring subsystem 200, and the terminal device 300. Constitutive elements installed in the monitoring target device 100 may be referred to as an target side system, while the log manager subsystem 120, the monitoring subsystem 200, and the terminal device 300 may be referred to as a center side system. Note that although only one monitoring target device 100 is shown in the example of FIG. 1, in a real system, communications in multiple monitoring target devices 100 may be taken as target for monitoring.

The monitoring target device 100 is an target to be monitored by the security monitoring system according to the present embodiment, and is a device that generates logs acquired by the detector device 110 and the log manager subsystem 120. The monitoring target device 100 is specifically a server or the like that runs installed software such as an intrusion detection system (IDS), an intrusion prevention system (IPS), or other security system, or software like a firewall or anti-virus software.

Note that an example is explained in the present embodiment where a log analysis system is taken as a security monitoring system, and the log analysis system acquires a communication log as a network communication monitoring target. However, suitable examples of the present embodiment are not limited to the aforementioned example. It is also possible to apply the log analysis system of the present embodiment in order to acquire and investigate a variety of logs generated by a variety of processes other than communications.

The detector device 110 is configured by a sensor 111 and a sensor manager 112. The sensor 111 is a monitoring target unit of the security monitoring system according to the present embodiment. The sensor 111 may be achieved by using a communication detection function in the monitoring target device 100, for example. The sensor 111 acquires data relating to communications in real time. The sensor manager 112 may be achieved by using a function of the monitoring target device 100, for example. The sensor manager 112 manages the sensor 111. That is, the sensor 111 and the sensor manager 112 may be provided in a variety of forms such as software, software and hardware combinations, using a variety of security system functions such as IDS/IPS, a firewall, anti-virus software, and the like. In an actual system, a variety of types of sensors 111 and sensor managers 112 may be used depending upon the specifications, uses, and usage environment of the monitoring target device 100 set as an target to be monitored.

The log acquisition agent 121 sends data relating to communications acquired by the sensor 111 managed by the sensor manager 112 to the log manager subsystem 120 in real time as a communication log. In the present embodiment, the communication log sent by the log acquisition agent 121 to the log manager subsystem 120 is referred to as a "raw log". The log acquisition agent may be provided as a computer program, for example. A function of sending the raw log to the log manager subsystem 120 may be realized by installing and running the log acquisition agent 121 in the monitoring target device 100. A variety of different sensors and sensor managers can be used for the sensor and the sensor manager 112 that acquire the raw log, as described above. The content and format of information included in the raw log may thus differ according to the type of the sensor 111 and the sensor manager 112 that acquire the raw log.

Note that, with the embodiment illustrated in FIG. 1, a configuration is employed in which the log acquisition agent 121 is installed in the monitoring target device 100 as a target side system. However, the present embodiment is not limited to this type of configuration. The log acquisition agent 121 may also be configured as a center side system without installation in the monitoring target device 100. In this case the log acquisition agent 121 may be configured as an independent server or the like connected to the monitoring target device 100 through a network, and the log acquisition agent 121 may also be achieved as one function of the log manager subsystem 120.

The log manager subsystem 120 acquired a raw log from the log acquisition agent 121. Raw logs are therefore acquired for each log acquisition agent 121 in the log manager subsystem 120. Further, the log manager subsystem 120 divides the acquired raw logs into communication log files for each sensor, and sends the communication files to the monitoring subsystem 200 in real time. The log manager subsystem may be realized by using a computer, for example. That is, by using a CPU to execute a program stored in a storage device of a computer, the function described above may be realized. The raw logs acquired from the log acquisition agent 121 are divided into communication log files, and sent to the monitoring subsystem 200.

The monitoring subsystem 200 is a processor unit for performing processing on the communication files acquired from the log acquisition agent 120. The monitoring subsystem 200 includes a collector unit 210, a detector unit 220, an analysis unit 230, and a manual analysis unit 240. The monitoring subsystem 200 processes communication log files acquired from the log acquisition agent 120 using processor units 210, 220, 230, and 240, in that order, extracting problematic communications. In other words, the monitoring subsystem 200 divides communications performed by the monitoring target device 100 displayed in the communication log file into communications having problems, and communications that do not have problems.

It is possible to create the processor units 210, 220, 230, and 240 in the monitoring subsystem 200 by using multiple servers (hardware). The multiple servers can execute processing mutually in parallel and asynchronously. In the present embodiment, transfer of the communication log files between the processor units 210, 220, 230, and 240 in the monitoring subsystem 200 may be done by using asynchronous communications based on Java Message Service (JMS) or the like, for example. The monitoring subsystem 200 is realized by using a computer, for example. That is, a CPU can be made to execute a program stored in a storage device of a computer, thus achieving functions of each processor unit 210, 220, 230, and 240. Details of each of the processor units 210, 220, 230, and 240, as well as communications between the processor units, are provided below.

The terminal device 300 is a device for outputting processing results found by the monitoring subsystem 200. The terminal device 300 is a device that a user (analyst) uses when analyzing communications in the monitoring target device 100. Communications in the monitoring target device 100 are divided into problematic communications and communications that do have problems, and provided as processing results by the monitoring subsystem 200. Problematic communications include those where it is clear that the communication is unauthorized, and those where there is a possibility that the communication is unauthorized. The analyst user of the terminal device 300 can analyze those communications that may be unauthorized based on the processing results of the monitoring subsystem 200 output to the terminal device 300, and can then judge whether or not the communications are unauthorized.

The terminal device 300 may be realized by using a computer, for example. That is, a CPU can be used to execute a program stored in a storage device of a computer, thus achieving each function of the terminal device 300. Specific functions of the terminal device 300, and details of the content and format of information output in the terminal device 300, are described below.

Functions of Collector Unit

Figure 2:
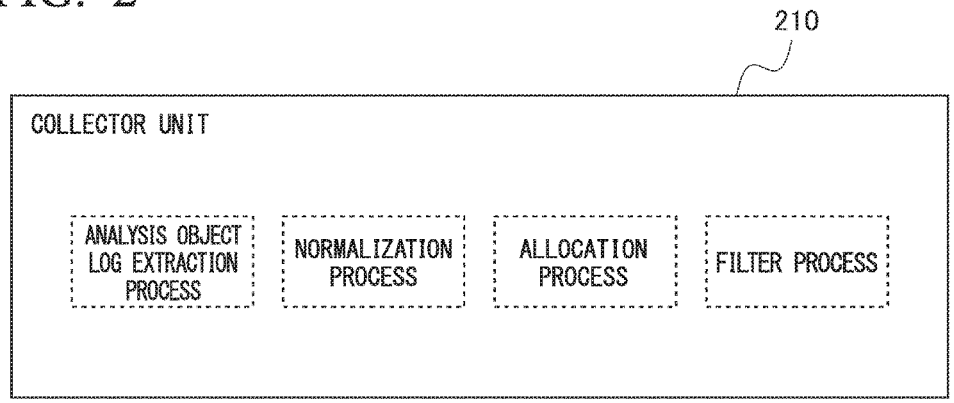
FIG. 2 is a diagram illustrating an example of the functional configuration of a collector unit configuring a monitoring subsystem illustrated in FIG. 1.

FIG. 2 is a diagram illustrating an example of functional configuration of the collector unit 210 configuring the monitoring subsystem 200 illustrated in FIG. 1.

The collector unit 210, which is a first processor unit, performs setting processing to the communication log file acquired from the log manager subsystem 120 for each type of detector device 110 that has acquired a base communication log (raw log) of the communication log file. The term type of detector device 110 as used here unit a product type such as an IDS/IPS, firewall, anti-virus software, or the like that provides functions of the sensor 111 and the sensor manager 112 of the detector device 110. Note that information that specifies the type of the detector device 110 (such as ID, product name, or the like) may be included in the communication log file, for example.

As FIG. 2 illustrates, the collector unit 210 of the present embodiment performs the following processes on the acquired communication log file: processing to extract an analysis target log, processing to normalize a communication log, processing to allocate the communication log, and filtering.

During processing to extract the analysis target log, the collector unit 210 extracts a communication log that becomes an target for processing (analysis) by the monitoring subsystem 200 from among communication logs included in a communication log file acquired from the log manager subsystem 120. Operation logs where the sensor 111 of the detector device was operating or stopped (logs that do not need to be analyzed) are included in the communication log file (raw log) acquired from the log manager subsystem 120. The collector unit 210 extracts only information that becomes a predefined processing target (analysis target) for the monitoring subsystem 200, and removes other information.

The collector unit 210 normalizes the extracted analysis target communication log based on a predefined rule during processing to normalize the communication log. Specifically, the collector unit 210 takes information such as date and time, protocol number, sender Internet Protocol address (IP address), sender port, destination IP address, destination port, and the like in the communication log and prepares it in a common format. For example, the collector unit 210 standardizes the criteria (western style, Japanese style, or the like) and format for describing the date and time, and standardizes the representation system (notational system) for IP addresses.

Depending upon the type of the detector device 110, there may be times where a portion of information in the acquired communication log subject to normalization processing is not included. To handle such cases, the collector unit 210 may perform a process such as entering a predefined default value as a substitute, substituting a value (Null) that indicates no data, performing analysis without supplementing the information, or the like. Specifically, the method employed is determined according to the type of deficient information. Note that for cases where the communication log format does not match the product specifications of the detector device 110 that acquires the communication log, and for cases where the values in the acquired communication log are abnormal, the collector unit 210 determines that the acquired communication log is a corrupt communication log, removes the communication log from the analysis targets, and stores the corrupt communication log in a storage database. Abnormal values in an acquired communication log may be due to, for example, date information being a date in the future.

Processing for allocating the communication log is one where a normalized communication log is divided into communication logs per monitoring target determined by contract or the like for cases where the detector device 110 is a data center model that takes communications in multiple monitoring target devices 100 as targets. For example, when implementing a service provided by the detector device 110 set up on a network under an environment where a registered monitoring target device 100 is utilized, it is possible that one detector device 110 detects communications from multiple monitoring target devices 100. In this case, communication logs in multiple monitoring target devices 100 are included in the communication log file acquired by the detector device 110. In order to perform analysis of the communication log per individual customer, in the present embodiment the collector unit 210 divides the communication log by monitoring target device 100. Therefore allocation processing of the communication log is not necessary for cases where a data center model embodiment is not employed and individual detector devices 110 are provided for each monitoring target. This is because the communication log is already allocated in advance.

Allocation of the communication log may be performed based on IP address range information, for example. Specifically, a possible example is explained below. That is, an IP address range handled by the detector device 110 may be from [x. x. x. 1] to [x. x. x. 30], where x is a number from 0 to 255. IP addresses allocated to a monitoring target device of a customer A may be from [x. x. x. 1] to [x. x. x. 10]. IP addresses allocated to a monitoring target device of a customer B may be from [x. x. x. 11] to [x. x. x. 12]. IP addresses allocated to a monitoring target device of a customer C may be from [x. x. x. 13] to [x. x. x. 30]. By registering the IP address ranges for each of the monitoring target devices 100 in the collector unit 210 in advance with this example, the collector unit 210 can determine which monitoring target device 100 a particular communication log relates to, and then perform allocation.

During filtering processing, the collector unit 210 determines whether or not the communication logs allocated by the allocation process described above are analysis targets, based on individual conditions and rules set according to individual customers. Items to be determined during filtering processing include destination IP address, destination port, sender IP address, sender port, and the like. That is, for cases where a destination IP address in a certain communication log is a specified value, the collector unit 210 can perform processing such as removing the communication log from the analysis target. Further, when the detection date and time is set as a determination item, the collector unit 210 can perform processing so that only communications that took place on or after the specified date and time are included as analysis targets.

The collector unit 210 thus extracts communication logs of processing targets from the communication log files in the raw log acquired from the log manager subsystem 120, and performs normalization. The collector unit 210 then sends the communication logs that have undergone processing to the downstreanm detector unit 220.

In the present embodiment, execution unit for performing the processes described above may be configured by separate components for each small processor unit. By combining blocks of componentized processor units (hereinafter "processing unit block"), it becomes possible to easily configure processes corresponding to a variety of detector devices 110. Processing content (processor units) executed by the individual process unit blocks is not limited. The content may be set to make it possible to handle a variety of detector devices 110 by reconfiguring process unit blocks.

Figure 3:
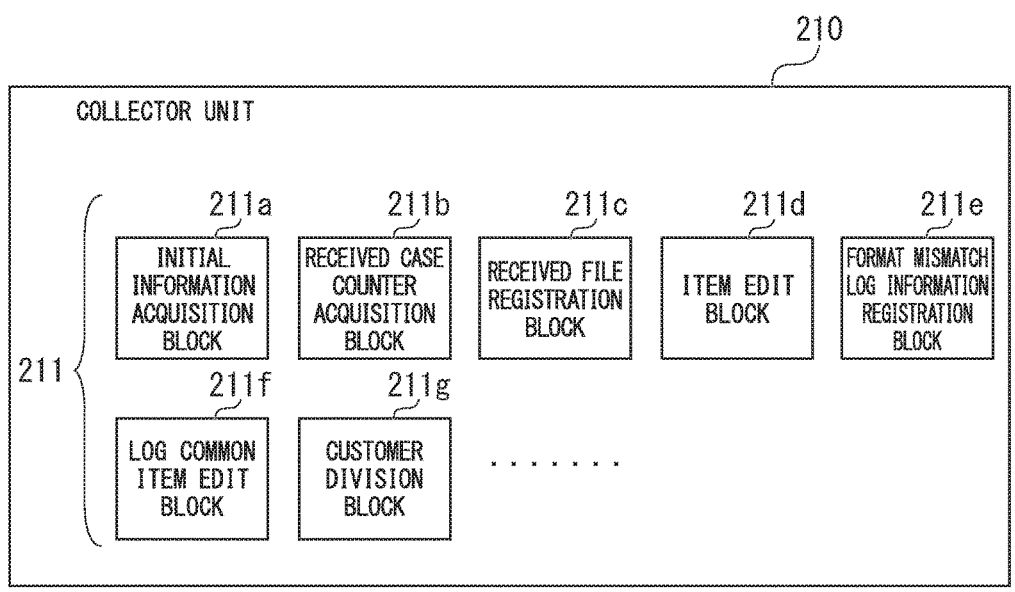
FIG. 3 is a diagram illustrating an example of the configuration of the collector unit illustrated in FIG. 2 configured by componentized process unit blocs.

FIG. 3 is a diagram illustrating an example of the configuration of the collector unit illustrated in FIG. 2 configured by componentized process unit blocs.

As FIG. 3 illustrates, multiple process unit blocks 211 include an initial information acquisition block 211a, a received case counter acquisition block 211b, a received file registration block 211c, an item edit block 211d, a format mismatch log information registration block 211e, logs common item edit block 211f, and a customer division block 211d. The initial information acquisition block 211a is a process unit block for performing a process to acquire initial information. The received case counter acquisition block 211b is a process unit block for performing a process to acquire a number of cases received. The received file registration block 211c is a process unit block for performing a process to register received files. The item edit block 211d is a process unit block for performing a process to editing items. The format mismatch log information registration block 211e is a process unit block for performing a process to register mismatch log information. The log common item edit block 211f is a process unit block for performing a process to edit log common items. The customer division block 211d is a process unit block for performing a process for customer division. The process unit blocks 211 are combined to configure the collector unit 211. Note that only a portion of the process unit blocks 211 that configure the collector unit 210 are illustrated in FIG. 3. For example, the process unit blocks 211 such as the initial information acquisition block 211a, the received case counter acquisition block 211b, and the received file registration block 211c handle the analysis target log extraction processing illustrated in FIG. 2. The process unit blocks 211 such as the item edit block 211d, the format mismatch log information registration block 211e, and the log common item edit block 211f handle the normalization processing illustrated in FIG. 2. The process unit blocks 211 such as the customer division block 211g handle the allocation processing illustrated in FIG. 2.

In the present embodiment, the type and sequence of the applicable process unit blocks 211 are set according to the type of the detector device 110 (product types such as IDS/IPS, firewall, anti-virus software, and the like). That is, an applicable sequence of the process unit blocks 211 is prepared for each type of the detector device 110 of the monitoring target device 100 set an target to be monitored. Processing is then performed by each process unit block 211 by applying the sequence set in order to perform communication log file processing according to the type of the detector device 110 that acquires the processing target communication log file.

Results of processes performed by each of the process unit blocks 211 of the collector unit 210 may be stored temporarily in a computer memory that configures the collector unit 210, for example. The results are then sent to the downstream detector unit 220 along with the communication log once processing by the collector unit 210 is complete.

Functions of Detector Unit

Figure 4:
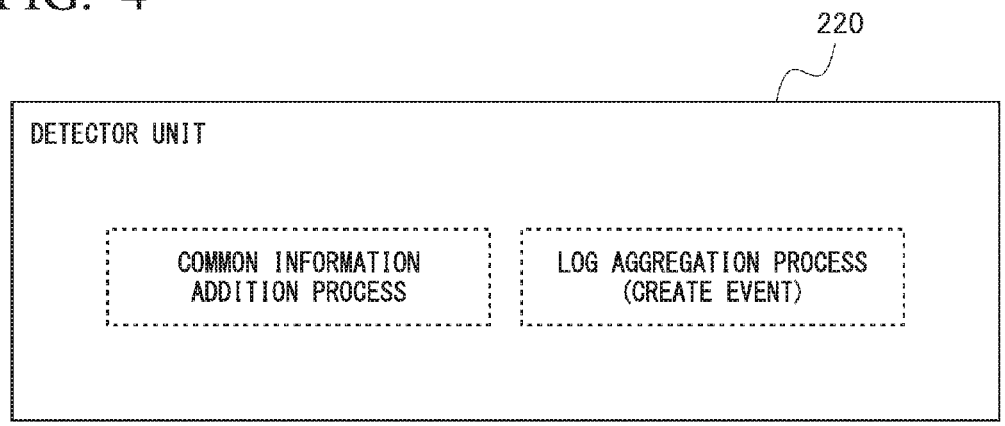
FIG. 4 is a diagram illustrating an example of the functional configuration of a detector unit configuring the monitoring subsystem illustrated in FIG. 1.

FIG. 4 is a diagram illustrating an example of functional configuration of the detector unit 220 configuring the monitoring subsystem 200.

The detector unit 220, which is a second processor unit, performs processes on communication logs acquired from the upstream collector unit 210. The processes are set according to the type of the detector device 110 that acquires the base communication log (raw log) of the communication log file. As used herein, type of the detector device unit security service category (IDS/IPS, firewall, or the like) for providing functions of the sensor 111 and the sensor manager 112 of the detector device 110. Note that information that specifies the type of the detector device (such as ID, equipment name) may be included in the communication log file, for example.

As FIG. 4 illustrates, the detector unit 220 of the present embodiment performs common information addition processing and log aggregation (creating events) processing of the communication log processed by the collector unit 210.

The detector unit 220 adds common information used in communication log analysis during common information addition processing. Common information is information relating to common items in each communication log. In the present embodiment, the following five items are set as common information: attack pattern information (original signature ID), communication direction classification, rule action information, protocol number or name, and country code.

Attack pattern information is information added to communication logs by the monitoring subsystem 200 to specify an attack pattern. When the detector device 110 detects some type of attack in the communication log (raw log), information specifying the detected attack (manufacturer or signature information) is added to the communication log. However, the format of the information differs depending upon the type of the monitoring target device 100 and the type of the detector device 110. Accordingly, the detector unit 220 adds original information (attack pattern information) to the communication log in the present embodiment.

Communication direction classification is information that displays whether a communication shown by the communication log is a communication performed toward from an external network toward an internal network classified by the monitoring target device 100, or is a communication performed in the opposite direction from an internal network, through the monitoring target device 100, toward an external network. In the network security field, the implications and importance of communications differs greatly by whether a communication source is an internal network or an external network. A case of a communication log for communications performed by an information processing device infected with a computer virus is explained as a specific example. In this case the information processing device infected with a computer virus exists in an external network, so there are no particular problems provided that a communication is from the external network. On the other hand when the communication is sent from an internal network, when the information processing device infected with a computer virus exists in an internal network that is a target to be protected of the monitoring target device 100, it must be handled. In the present embodiment, the detector unit 220 adds communication direction classification information showing the direction of communications in the communication log. The communication direction classification information may be obtained, for example, by referring to network address and private address of the monitoring target device 100 and determining whether a sender IP address or a destination IP address is an internal network of the monitoring target device 100 or an external network.

Rule action information is information showing an action performed by the detector device 110 in response to a communication when the communication is detected in the monitoring target device 100. For cases where a security device such as IDS or IPS is used as the detector device 110, the device reports that a dangerous communication has been detected, or stops the communication by not providing permission, based on device functionality. Information showing the type of action performed is added by the detector unit 220. There are cases where rule action information is added to the communication log depending upon the security device used for the detector device 110. However, even for identical actions, the name used for the action may differ depending upon the type of the security device used. The detector unit 220 of the monitoring subsystem 200 therefore adds standardized names.

Protocol number or name is information showing a communication protocol type used in communications displayed in a communication log. Several types of protocols exist, such as TCP an UDT, and the detector unit 220 therefore adds information for classifying the protocols. In the present embodiment, information showing communication protocol types may be set based on Internet Assigned Number Authority (IANA) definitions, for example.

Country code is information showing sender country and a destination country for communications displayed in a communication log. The countries are determined based on a sender IP address and a destination IP address in the communication log. Country codes are used mainly as statistical information. Country codes can also be used in communication log analysis for cases when considering differences in communication danger levels based on whether or not the sender country or the destination country is one having a high amount of attacks by unauthorized communications, and whether or not unauthorized communications are coming from within the country where the detector unit 220 is located.

The detector unit 220 thus adds information to communication logs as common format information. The information has a high utility value for analyzing communications logs.

The detector unit 220 considers communications logs based on need, and generates events, which are analysis unit information, during log aggregation processing. The information granularity of communication logs differs depending on the type of the security device used as the detector device 110. For example, when the detector device 110 is a firewall and a communication subject to detection is found, the communication is detected immediately by the sensor 111. If the detector device 110 is instead an IDS or the like, a communication may be judged to be dangerous by the sensor 111 according to a predefined judgment rule based on multiple occurrences of a dangerous communication taking place. For cases where the detector device 110 is anti-virus software, the infection is detected by the sensor 111 when an information processing device target is infected by a computer virus. The weight of information in one communication log therefore differs according to the type of the detector device 110. In the present embodiment, the detector unit 220 aggregates multiple communication logs and creates events, and aligns information granularity depending upon the type of the detector device. That is, the detector unit 220 creates one event with a very small number of communication logs when single communication logs acquired by the detector device 110 have a large amount of information. On the other hand, the detector unit 220 creates one event with a rather large number of communication logs when single communication logs acquired by the detected by the detector device 110 have a small amount of information.

As one example, in the present embodiment event creation processing differs between cases where the detector device 110 is a firewall and for cases where the detector device 110 is a different type of device. Specifically, if the detector device 110 is a firewall, there is a small amount of information in communications logs (one communication detected by the sensor 111), as described above. The detector unit 220 therefore generates an event by aggregating acquired communication logs according to a predefined rule. Communication logs acquired when the detector device is one other than a firewall have a relatively large amount of information per communication log compared to those of a firewall (communications and the like detected by the sensor 111 involve multiple communications). In this case the detector unit 220 thus creates one event for one log.

Event generation processing when the detector device 110 is a firewall is performed as follows. First, the detector unit 220 gathers communication logs conforming to a predefined aggregation rule and creates an event, based on information included in the communication logs and on common information added to communication logs by common information addition processing described above. Specifically, the detector unit 220 may take communication logs as targets when the following judgement items are common: customer ID, detection date, sender IP address, sender port number, destination IP address, or destination port number included in communication logs; and communication direction classification, rule action, and protocol number (name), which are common information. The detector unit 220 gathers applicable communication logs together and creates one event when the number of the communication logs having common judgement items is equal to or exceeds a predefined threshold value.

Determination by host and scan aggregation is performed next on communication logs determined to be non-conforming based on the aggregation rules described above. Specifically, the detector unit 220 may take communication logs as targets when the following judgement items are common: customer ID, detection date, sender IP address, sender port number, destination port number included in communication logs; and common information including communication direction classification, rule action, and protocol number (name). The detector unit 220 gathers applicable communication logs together and creates one event when the number of the communication logs having a certain destination IP address, from among communication logs having common judgement items, is equal to or exceeds a predefined threshold value.

Next, determination is performed by port scan aggregation on communication logs determined to be non-conforming based on host scan aggregation described above. Specifically, the detector unit 220 may take communication logs as targets when the following judgement items are common: customer ID, detection date, sender IP address, sender port number, destination IP address included in communication logs; and common information including communication direction classification, rule action, and protocol number (name). The detector unit 220 gathers applicable communication logs together and creates one event when the number of the communication logs having a certain destination port number, from among communication logs having common judgement items, is equal to or exceeds a predefined threshold value.

The detector unit 220 gathers applicable communication logs together, and creates one event from a predefined number of communication logs, for non-conforming communication logs determined by port scan aggregation. The detector unit 220 thus aggregates communication logs acquired by the detector device 110 of a firewall having a small information granularity. The information granularity approaches that of communication logs (events) acquired by other detector devices 110. The detector unit 220 then sends events having aligned information granularity to the downstream analysis unit 230.

In the present embodiment, execution unit for performing processes like those described above are configured by componentizing into small processor units. By combining componentized process unit blocks (hereinafter process unit blocks), the processing content performed by the detector unit 220 (such as type and sequence of individual processor units) can be designed. It then becomes possible to easily configure processes corresponding to a variety of monitoring target devices 100. There are no particular limitations placed on processing content (processor units) executed by individual process unit blocks. Content is set so that it is possible to handle various monitoring target devices 100 by combining the process unit blocks.

Figure 5:
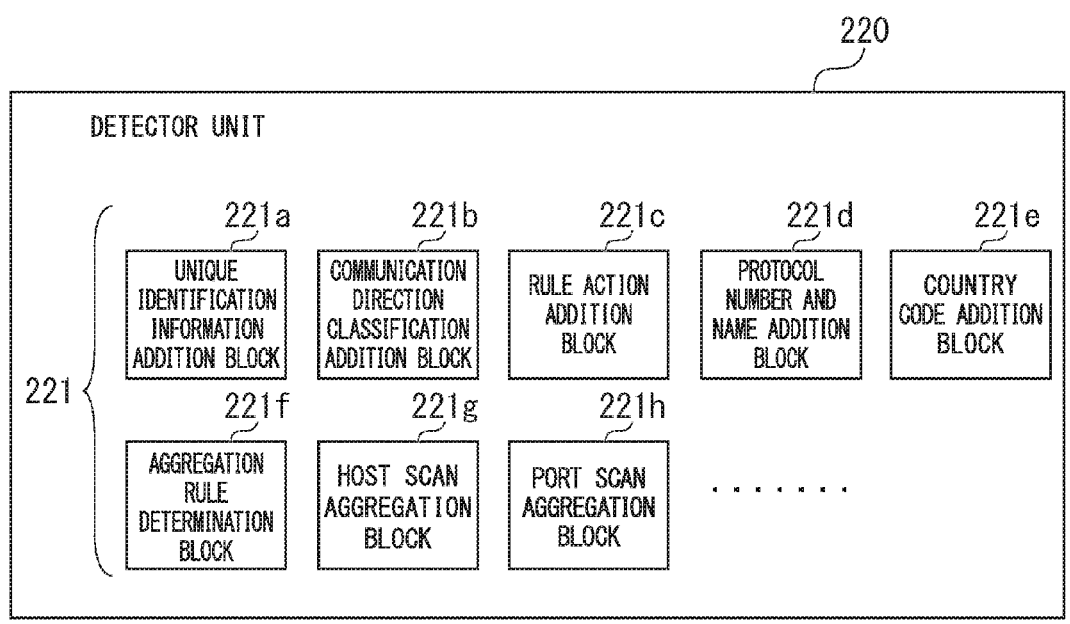
FIG. 5 is a diagram illustrating an example of the configuration of the detector unit illustrated in FIG. 4 configured by componentized process unit blocks.

FIG. 5 is a diagram illustrating an example of the configuration of the detector unit 220 configured by componentized process unit blocks.

With the example illustrated in FIG. 5, multiple process unit blocks 221 include a unique identification information addition block 221a, a communication direction classification addition block 221b, a rule action addition block 221c, a protocol number and name addition block 221d, a country code addition block 221e, an aggregation rule determination block 221f, a host scan aggregation block 221g, and a port scan aggregation block 221h. The unique identification information addition block 221a is a process unit block for adding unique identification information. The communication direction classification addition block 221b is a process unit block for adding communication direction classifications. The rule action addition block 221c is a process unit block for adding rule actions. The protocol number and name addition block 221d is a process unit block for adding protocol numbers and names. The country code addition block 221e is a process unit block for adding country codes. The aggregation rule determination block 221f is a process unit block for determining aggregation rules. The host scan aggregation block 221g is a process unit block for aggregating host scans. The port scan aggregation block 221h is a process unit block for aggregating port scans. Combining the process unit blocks 221 configures the detector unit 220. Note that only a portion of the process unit blocks 221 that configure the detector unit 220 are illustrated in FIG. 5. For example, the process unit blocks 221 such as the unique identification information addition block 221a, the communication direction classification addition block 221b, the rule action addition block 221c, the protocol number and name addition block 221*d*, and the country code addition block 221*e* handle common information addition processing illustrated in FIG. 4. The process unit blocks 221 such as the aggregation rule determination block 221*f* the host scan aggregation block 221*g*, and the port scan aggregation block 221*h* handle log aggregation (event creation) processing illustrated in FIG. 4

In the present embodiment, the type and sequence of the applicable process unit blocks 221 are set depending upon the type of the monitoring target device 100 (security device classification). That is, an applicable sequence of the process unit blocks 221 is prepared for each type of the monitoring target device 100 set as a monitoring target. Processing is then performed by each process unit block 221 by applying the sequence set in order to perform communication log file processing according to the type of the monitoring target device 100 that acquires the processing target communication log file.

Results of processes performed by each of the process unit blocks 221 of the collector unit 220 may be stored temporarily in a computer memory that configures the collector unit 220, for example. The results are then sent to the downstream analysis unit 230 along with the communication log once processing by the detector unit 220 is complete.

Functions of Analysis Unit

Figure 6:
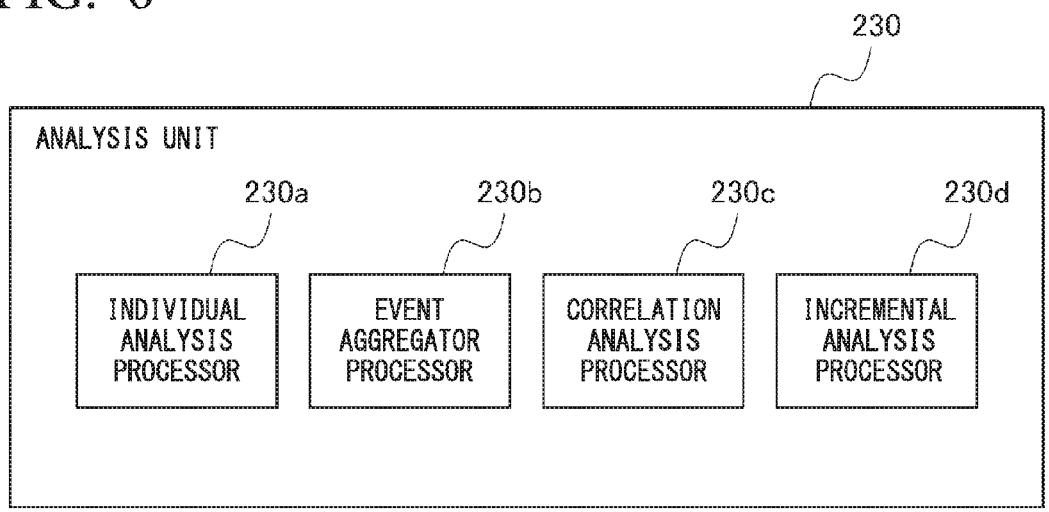
FIG. 6 is a diagram illustrating an example of the functional configuration of an analysis unit configuring the monitoring subsystem illustrated in FIG. 1

FIG. 6 is a diagram illustrating an example of functional configuration of the analysis unit 230 configuring the monitoring subsystem 200.

In the configuration example illustrated by FIG. 6, the analysis unit 230, which is the third processor unit, is configured by an individual analysis processor 230*a*, an event aggregation processor 230*b*, a correlation analysis processor 230*c*, and an incremental analysis processor 230*d*.

The individual analysis processor 230*a* determines whether or not a problem exists in individual events generated by the detector unit 220. Specifically, the individual analysis processor 230*a* checks events (performs matching) and lists (black lists) related to unauthorized communications, and determines that communication displayed in a specific event is an unauthorized communication when a match is found. IP addresses relating to problem communications may be recorded in an unauthorized communication list, for example. The individual analysis processor 23*a* then determines that a communication is an unauthorized communication when either a sender IP address or a destination IP address of a communication displayed in an event matches an IP address recorded in a list.

Further, the individual analysis processor 230*a* determines whether or not to perform processing based on a correlation between events for events where it has been determined that there is a problem communication due to matching with a problem communication list. That is, the individual analysis processor 230*a* functions as a classification unit (classifier) for classifying events as events for which analysis is performed based on a correlation, and events for which correlation analysis is not performed based on a correlation. A determination of whether or not an event is an target for analysis based on a correlation may be made as follows, for example: the determination may be made by common information (such as attack pattern information, communication direction information, and the like) added to a communication log by the detector unit 220 during common information addition processing, based on specific communication content. For events that have been determined to be targets for which analysis processing is to be performed based on a correlation, aggregation processing is performed next by the event aggregation processor 230*b*. On the other hand, for events where it has been determined that analysis is not to be performed based on a correlation, the analysis unit 230 sends the event to the manual analysis unit 240 without later performing analysis (that is, as an target not subject to correlation analysis or incremental analysis).

The event aggregation processor 230*b* generates aggregates events that are determined by the individual analysis processor 230*a* to be analysis targets based on a correlation. The events are aggregated based on a predefined rule. The event aggregation processor 230*b* also generates an event list (event chain) from one or multiple events. In addition, the event aggregation processor 230*b* aggregates event chains based on a predetermined rule, and generates an incident candidate from one or multiple event chains. The incident candidate becomes a detection target by analysis (referred to as detected incident candidate). That is, the event aggregator 230*b* functions as aggregation unit (aggregator) for aggregating events and generating detected incident candidates. Specifically, the event aggregation processor 230*b* may do the following for attacks due to unauthorized access from a server or the like existing on an external network. For example the event aggregation processor 230*b* may, for example, extract communications assumed to be attacks from the same attacker (access), using the same unit of attack (access method, having the same attack target, or the like, and collect the extracted communications as detected incident candidates. Extraction of communications assumed to be attacks by the same attacker, using the same unit of attack having the same attack target, or the like may be performed based on information such as sender IP address, communication direction classification, detection date, or the like, for example.

Communication log acquisition by the detector device 110 and the log manager subsystem 120, and processing by the collector unit 210 and the detector unit 220 of the monitoring subsystem 200 occurs as needed. Events are thus generated one after another with the passage of time. When determined by the event aggregation processor 230*c* to be an target event included in a specific detector incident candidate, a newly generated event is incorporated into the detector incident candidate. The detector incident candidate therefore becomes an target for processing by the correlation analysis processor 230*c* and by the incremental analysis processor 230*d* for each newly added event.

By performing attack pattern incorporation determination and case threshold exceeded determination, the correlation analysis processor (analysis unit, analyzer) 230*c* determines whether or not the detected incident candidate, which is a combination of multiple events, is a problem communication.

During attack pattern combination determination, the correlation analysis processor 230*c* determines whether or not a communication specified by a detected incident candidate is a problem communication. The determination is made using a specific communication type based on a communication direction, sender and destination IP addresses (ranges), sender and destination, rule actions, sender and destination country codes, session data, and the like, and based on attack pattern information (original signature ID). That is, the correlation analysis processor 230*c* determines whether or not communication content specified by a detector incident candidate corresponds to an attack pattern specified by attack pattern information. Note that the correlation analysis processor 230*c* determines whether or not there is a high possibility of performing an actual attack (exploitation of information, deletion, or the like) according to the information.

During case threshold exceeded determination, the correlation analysis processor 230c determines whether or not a communication specified by a detected incident candidate is a problem communication. The determination is made based on information of the number of cases of communication direction, sender and destination IP addresses (ranges), sender and destination, rule actions, sender and destination country codes, and the like in communication logs included in a detected incident candidate. The correlation analysis processor 230c determines whether or not a number of communications specified by a detected incident candidate has increased greatly compared to a normal amount.

Figure 7:
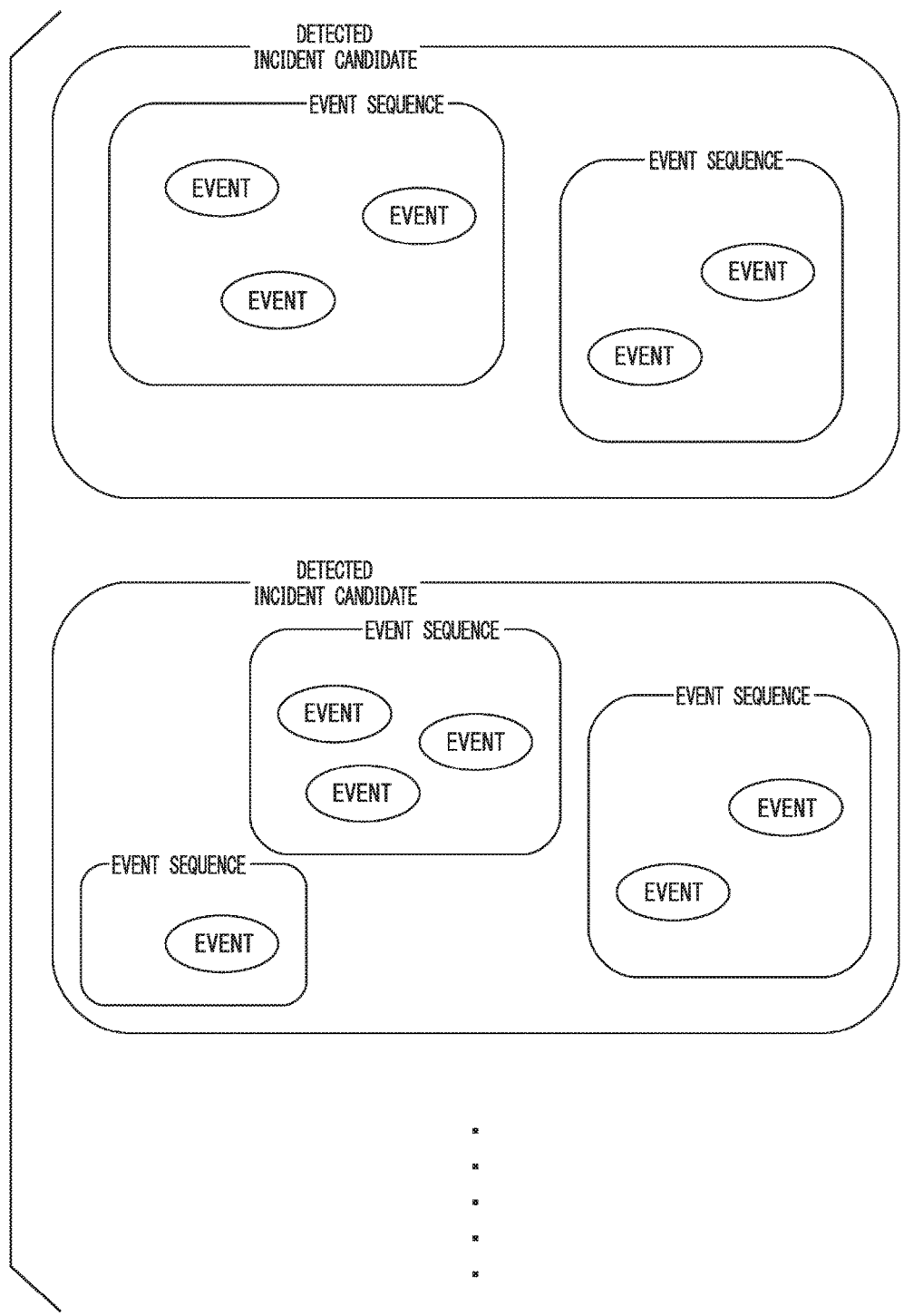
FIG. 7 is a diagram illustrating a concept of correlation analysis in the present embodiment.

FIG. 7 is a diagram illustrating a concept of correlation analysis.

The event aggregation processor 230b of the analysis unit 230 aggregates events that become aggregation processing targets, generates an event sequence and in addition, generates a detected incident candidate from among events acquired from the detector unit 220. The event aggregation processor 230b then performs attack pattern combination determination and case threshold value exceeded determination for each detected incident candidate based an event sequence included in each detector incident candidate and on a correlation between events.

The incremental analysis processor 230d determines whether or not a detected incident candidate, which is a combination of multiple events, is a problem communication by performing incident change determination, attack unit increase determination, attack case increase determination, and attack destination increase determination. For example, for attacks from a server or the like existing in an external network, the attack may not be a single incident but instead the same attack may be continually repeated, attack content may be changed, or attack destinations may be increased. The incremental analysis processor 230d determines whether or not problem communications have suspected incident changes based on the communication log included in the detected incident candidate.

Further explanation regarding determinations is as follows. For example, the incremental analysis processor 230d may determine applicable changes to analysis rules (rules for attack pattern combination determination or case threshold exceeded determination) used in analyzing each detection event candidate, based on a fixed period (for example, one day) analysis results from the correlation analysis processor 230c.

Application change determination may be used for cases where rules different from a previous analysis are applied (different incident). The incremental analysis processor 230c determines that a communication included in a determination target detected incident candidate is a problem communication.

Attack unit increase determination may be used for cases where identical rules to a previous analysis are applied, but confirmation target attack pattern information has increased (attack unit of the confirmation target have increased). The incremental analysis processor 230d determines that a communication included in a determination target detected incident candidate is a problem communication.

Attack case increase determination may be used for cases where communications have identical confirmation target attack pattern information (identical attack unit), for cases where communications are continuing from the identical attacker, and for cases where the number of events per unit time due to such communications has increased. The incremental analysis processor 230d determines that a communication included in a determination target detected incident candidate is a problem communication.

Attack destination increase determination may be used for cases attack destinations or connection destinations have increased. The incremental analysis processor 230d determines that a communication included in a determination target detected incident candidate is a problem communication.

Figure 8A:
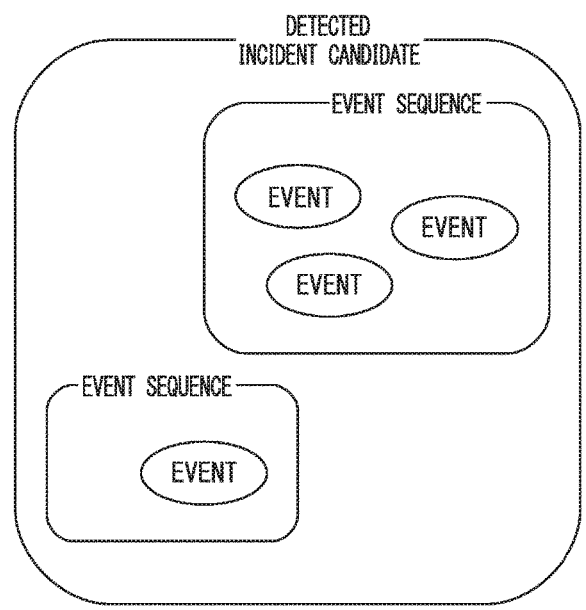
FIG. 8A is a diagram illustrating a concept of incremental analysis in the present embodiment, and is a diagram illustrating an example of the configuration of a detected incident candidate that becomes a correlation analysis target for a certain analysis.
Figure 8B:
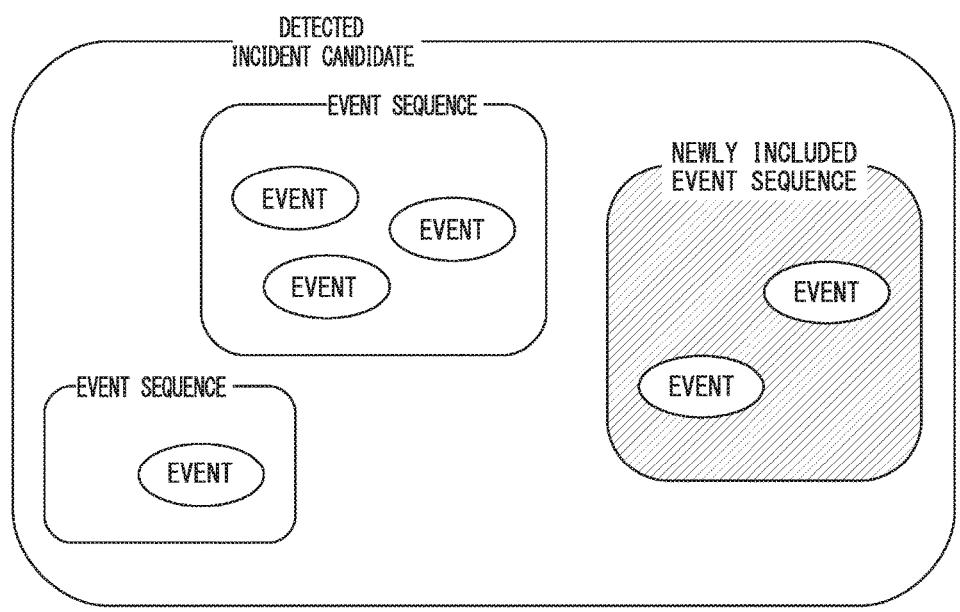
FIG. 8B is a diagram illustrating a concept of incremental analysis in the present embodiment, and is a diagram illustrating an example of the configuration of the same detected incident candidate for a next analysis.

FIG. 8A and FIG. 8B are diagrams illustrating a concept of incremental analysis in the present embodiment. FIG. 8A illustrates an example of the configuration of one detected incident candidate that becomes a correlation analysis target for a certain analysis. FIG. 8B illustrates an example of the configuration of the same detected incident candidate for a next analysis.

A previous analysis configuration (refer to FIG. 8A) and a current analysis configuration (refer to FIG. 8B) relating to the same detector incident candidate are compared here. With the current analysis configuration, an event sequence (shaded event sequence in FIG. 8B) not included in the previous analysis is present in the current analysis configuration. Accordingly, the detected incident candidate is determined to be a problem communication in any of incident change determination, attack unit increase determination, attack case increase determination, or attack destination increase determination, described above.

After each type of determination is performed, the analysis unit 230 sends analysis results for each determination incident candidate to the manual analysis unit 240, with associated analysis target detected incident candidates. The analysis results from the analysis unit 230 show that each detected incident candidate is an unauthorized communication, a problem communication (a communication that is possibly an unauthorized communication), or is not an unauthorized communication.

In the present embodiment, the individual analysis processor 230a, the event aggregation processor 230b, the correlation analysis processor 230c, and the incremental analysis processor 230d that perform the processes described above are configured as componentized into small processor units. By combining componentized process unit blocks (hereinafter process unit blocks), the processing content performed by each processor 230a to 230d (such as type and sequence of individual processor units) can be designed. It thus becomes possible to easily respond when attacks by heretofore unknown attack methods are discovered. This may be accomplished by increasing processing unit blocks for applicable processing in order to determine that a communication is from such an attack.

Figure 9:
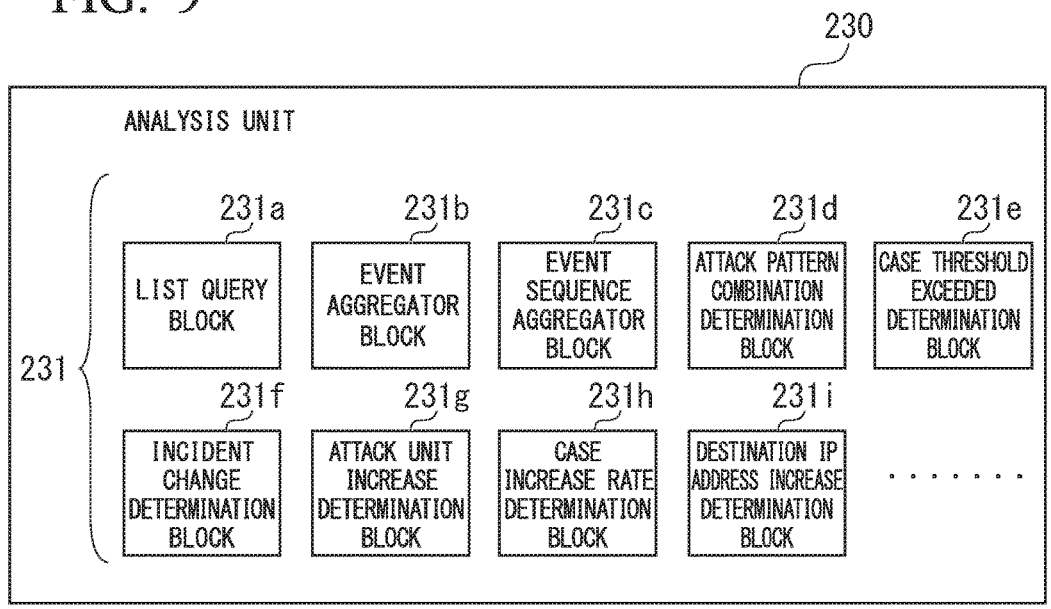
FIG. 9 is a diagram illustrating an example of the configuration of the analysis unit illustrated in FIG. 6, configured by componentized process unit blocks including an individual analysis processor, an event integration processor, a correlation analysis processor, and an incremental analysis processor.

FIG. 9 is a diagram illustrating an example of the configuration of the analysis unit 230, configured by componentized process unit blocks including the individual analysis processor 230a, the event integration processor 230b, the correlation analysis processor 230c, and the incremental analysis processor 230d.

In the example illustrated by FIG. 9, multiple processing unit blocks 231 include a list query block 231a, an event aggregation block 231b, an event sequence aggregation block 231c, an attack pattern combination determination block 231d, a case threshold exceeded determination block 231e, an incident change determination block 231f, an attack unit increase determination block 231g, a case increase rate determination block 231h, and a destination IP address increase determination block 231i. The list query block 231a is a processing unit block for performing list queries. The event aggregation block 231b is a processing unit block for performing event aggregation. The event sequence aggregation block 231c is a processing unit block for performing event sequence aggregation. The attack pattern combination determination block 231d is a processing unit block for performing attack pattern combination determination processing. The case threshold exceeded determination block 231e is a processing unit block for performing determination that a number of cases has exceeded a threshold. The incident change determination block 231f is a processing unit block for performing for determining whether an incident has changed. The attack unit increase determination block 231g is a processing unit block for performing processing to determine that there is an increase in unit of attack. The case increase rate determination block 231h is a processing unit block for performing determination of a rate of increase in cases. The destination IP address increase determination block 231i is a processing unit block for performing determination of whether there is an increase in destination IP addresses. Combining the processing unit blocks 231 configures each processor 230a to 230d of the analysis unit 230. Note that only a portion of the processing unit blocks 231 that configure the analysis unit 230 are illustrated in FIG. 9. For example, the processing unit blocks 231, such as the list query block 231a, handle queries of a problem communication list by the individual analysis processor 230a. The processing unit blocks 231, such as the event aggregation block 231b and the event sequence aggregation block 231c, handle generation of event sequences and detected incident candidates by the event aggregation processor 230b. The processing unit blocks 231, such as the attack pattern combination determination block 231d and the case threshold exceeded determination block 231e, handle analysis by the correlation analysis processor 230c. The processing unit blocks 231, such as the incident change determination block 231f, the attack unit increase determination block 231g, the case increase rate determination block 231h, and the destination IP address increase determination block 231i, handle analysis by the incremental analysis processor 230d. Examples of the processing unit blocks 231 configure the individual analysis processor 230a, the event aggregation processor 230b, the correlation analysis processor 230c, and the incremental analysis processor 230d. The individual analysis processor 230a, the event aggregation processor 230b, the correlation analysis processor 230c, and the incremental analysis processor 230d can be prepared, and each can perform processing in parallel or asynchronously.

Results of individual analysis processing, event aggregation processing, correlation analysis processing, and incremental analysis processing performed by each of the process unit blocks 231 of the analysis unit 230 may be stored temporarily in a computer memory that configures the analysis unit 230, for example. The results are then sent to the downstream manual analysis unit 240 along with detector target incidents for which each type of analysis processing is complete, and with events not taken as aggregation targets during individual analysis processing.

Functions of Manual Analysis Unit

Figure 10:
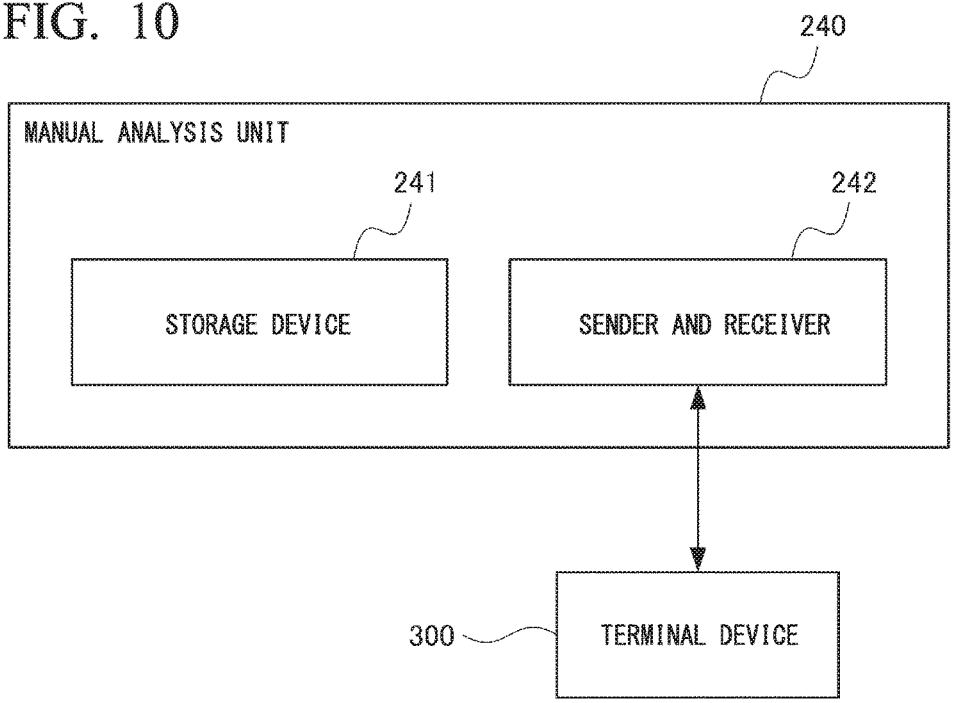
FIG. 10 is a diagram illustrating an example of the functional configuration of a manual analysis unit of the monitoring subsystem illustrated in FIG. 1.

FIG. 10 is a diagram illustrating a functional configuration of the manual analysis unit 240 of the monitoring subsystem 200.

The manual analysis unit 240, which is the fourth processor unit, manages and stores events, event sequences, and detected incident candidate information obtained through each of the above processes performed by the detector unit 220 and the analysis unit 230 in a storage device 241, along with analysis results from the analysis unit 230. Further, the manual analysis unit 240 sends the events, event sequences, detected incident candidate information, and analysis results from the analysis unit 230 stored in the storage device 241 to the terminal device 300 using a sender and receiver 242 in response to a request from the terminal device 300. In addition, the manual analysis unit 240 obtains information of this type in the terminal device 300 from the sender and receiver 242, associates the acquired information with stored information, and manages the acquired information.

Communications Between Monitoring Subsystem Processor Units

The security monitoring system according to the present embodiment monitors communications in the monitoring target device 100, and detects problem communications in real time. That is, the security monitoring system is not one which analyzes stored communication log files and discovers problem communications after the fact. It is therefore preferable to transmit log files between each processor unit in the monitoring subsystem 200, in order to detect problem communications from communication logs, as speedily as possible. For example, connectionless communication is performed instead of using a connection type transmission such as Transmission Control Protocol (TCP). Connectionless communication based on JMS is thus performed in the present embodiment.

For cases where transmission of communication logs is performed by connectionless communication, a determination is not made as to whether or not each individual communication between the processor units in the monitoring subsystem 200 have been performed normally, unlike with connection type communications. Therefore the fact that communications have been performed normally cannot be confirmed, even if a processing target communication log file is lost during communications between processor units. It is thus necessary to employ a mechanism to detect when communications have not been performed normally for cases where a processing target communication log file is lost during processing by the monitoring subsystem 200.

Figure 11:
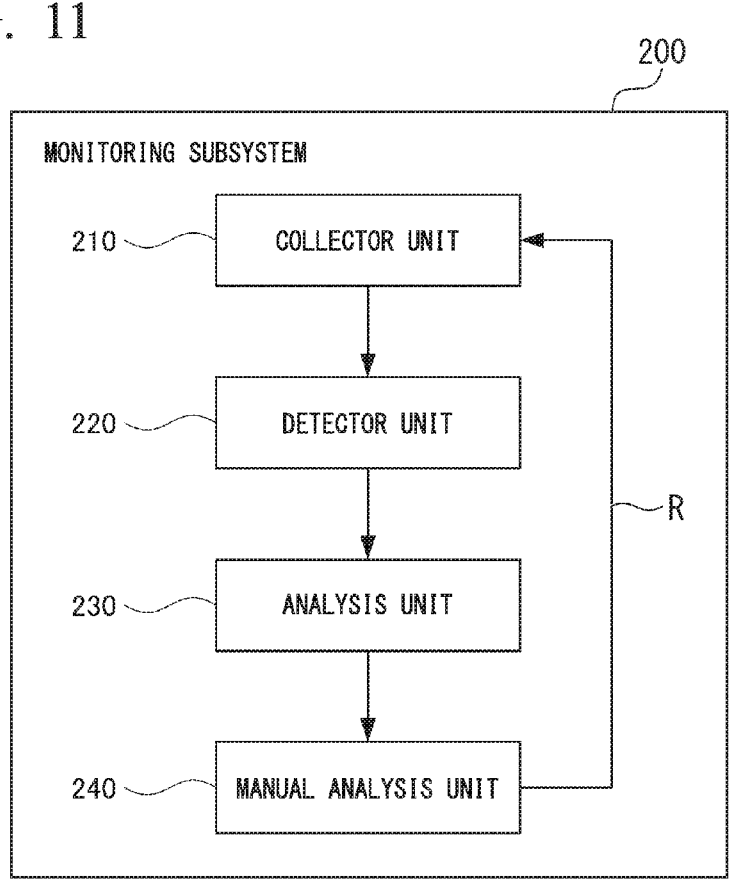
FIG. 11 is a diagram for explaining a method of conveying a communication log file in the present embodiment.

FIG. 11 is a diagram for explaining a method of conveying a communication log file in the present embodiment.

FIG. 11 illustrates examples of processor units configuring the monitoring subsystem 200 (an example of configuring the monitoring subsystem 200 by the collector unit 210, the detector unit 220, the analysis unit 230, and the manual analysis unit 240). In the present embodiment, a configuration for providing feedback to a leading processor unit is employed in the processor unit example illustrated in FIG. 11. The feedback configuration confirms that the transmission of communication logs from a leading processor unit (the collector unit 210) to a final processor unit (the manual analysis unit 240) has occurred normally.

That is, the manual analysis unit 240, which is the last processor unit of the monitoring subsystem 200, receives event or detected incident candidate information from the analysis unit 230, notifies the collector unit 210, which is the leading processor unit, that a communication log configuring the event or detected incident candidate information has been received. The leading collector unit 210 thus confirms that a processing target communication log file has arrived at the final processor unit (the manual analysis unit 240), through each of the processor units, without being lost. After sending a communication log file to the detector unit 220, which is a downstream unit, the collector unit 210 resends the same communication log file at fixed times, for example, until a predefined resend stop condition is satisfied.

An example of a resend stop condition may be reception from the manual analysis unit 240 of a notification showing that a communication log file has been acquired within a fixed time from a previous sending time. For cases where a resend stop condition is thus set and a processing target communication log file is lost for some reason and does not arrive at the manual analysis unit 240, notification from the manual analysis unit 240 to the collector unit 210 does not take place (the resend stop condition is not satisfied). Therefore the identical communication log file is resent from the collector unit 210 after a fixed amount of time has passed.

A condition where the same communication log file is sent a predefined number of times may also be set as another example of a resend stop condition. In addition, a predefined amount of time passing from the first transmission may also be set as yet another resend stop condition. By thus setting a resend stop condition, damage occurring to the monitoring subsystem 200 can be determined without loss due to connectionless transmission specifications for cases where a communication log file is not transmitted normally when transmission is repeated for a predefined number of times. In this case a system operator is notified that communication file resend has stopped, and that damage to the monitoring subsystem 200 has occurred. Note that a count of the number of times that the same communication file has been sent may be achieved by counting the number of times the collector unit 210 sends a communication log file, for example, and storing the counted number of times.

With a transmission method configured as described above, the fact that a communication log file has been lost at some stage during communication log file transmission between each processor unit can be understood for cases where the processing target communication log file does not arrive at the manual analysis unit 240. On the other hand, identifying where the communication log file was lost is not possible. However, in the present embodiment processes (analysis) on a communication log file are not completed if the communication log file does not arrive at the manual analysis unit 240. The manual analysis unit 240, which is positioned at the end of a processor unit sequence of the monitoring subsystem 200, is thus chosen as a searching position.

With the transmission method described above, a communication log file is transmitted again from the leading collector unit 210 to the final manual analysis unit 240, even if the communication file is lost somewhere between processor units during communication file transmission. Accordingly, if a communication log file is lost between the analysis unit 230 and the manual analysis unit 240, for example, the same communication log file is again transmitted even though processes performed by the detector unit 220 and the analysis unit 230 to the communication log file have been completed.

However, with the present embodiment, if a communication log file does not reach the manual analysis unit 240, processing results from each of the processor units are not stored in the storage device 241 of the manual analysis unit 240, and the results are lost along with the communication log file. Each of the processor units therefore performs processing of a resent communication log file, regardless of whether or not processes have already been performed when the communication log file was sent previously.

Figure 12:
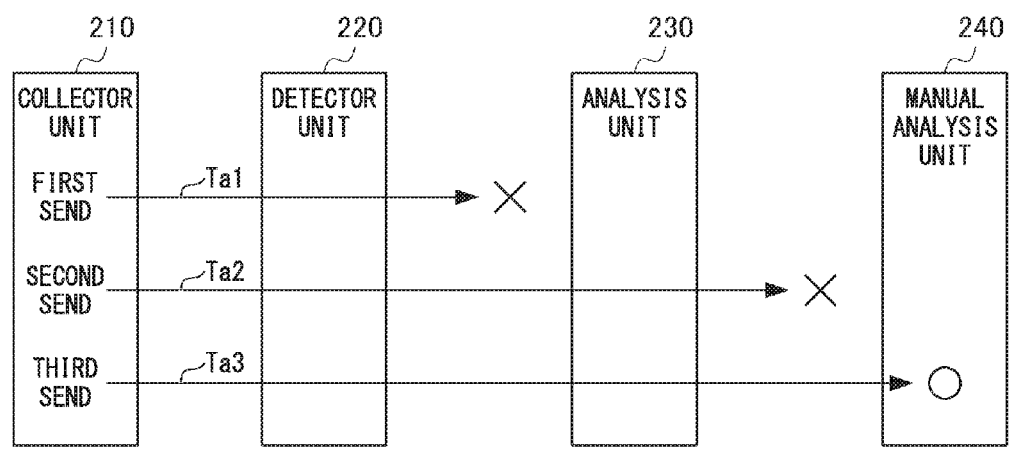
FIG. 12 is a diagram illustrating an example of transmitting a communication log file in the present embodiment.

FIG. 12 is a diagram illustrating an example of conveying a communication log file in the present embodiment.

In FIG. 12, "x" denotes that a communication log file has been lost, while "o" denotes that a communication log file has reached the manual analysis unit 240. An arrow Ta1 indicates being sent a first time, an arrow Ta2 indicates being sent a second time, and an arrow Ta3 indicates being sent a third time.

In the example illustrated in FIG. 12, when sent out a first time, a certain communication log file is sent from the collector unit 210 to the detector unit 220. After processing by the detector unit 220, the communication log file is sent from the detector unit 220 to the analysis unit 230. The communication log file does not arrive at the analysis unit, and is lost (refer to the arrow Ta1). In this case the manual analysis unit 240 does not notify the collector unit 210 that the communication log file has been acquired. The collector unit 210 therefore resends the communication log file. That is, the collector unit 210 sends the communication log file a second time.

Processing results from the detector unit 220 performed on the communication log file when sent the first time are lost, along with the communication log file first sent. The detector unit 220 therefore performs processing on the resent communication log file.

In the example illustrated in FIG. 12, when sent out a second time, the communication log file is sent from the analysis unit 230 to the manual analysis unit 240 after undergoing processing by the analysis unit 230. The communication log file is lost and does not arrive at the manual analysis unit 240 (refer to the arrow Ta2). In this case as well, the manual analysis unit 240 does not notify the collector unit 210 that the communication log file has been acquired. The collector unit 210 therefore resends the communication log file. That is, the collector unit 210 sends the communication log file a third time.

Processing results from the analysis unit 230 performed on the communication log file when sent the second time are lost, along with the communication log file sent the second time. The detector unit 220 and the analysis unit 230 therefore perform processing on the resent communication log file.

In the example illustrated in FIG. 12, when sent out a third time, the communication log file reaches the manual analysis unit 240, and is stored in the storage device 241 (refer to the arrow Ta3). The manual analysis unit 240 then notifies the collector unit 2 that the communication log file has arrived. Resending of the communication log file thus stops.

When employing a transmission method like that described above, a communication log file may be resent even if it is not lost. Specifically, there may be times where processing by intermediate processor units requires a certain amount of time, and before notification from the manual analysis unit 240 is made, a waiting time for the collector unit 210 to resend the communication log file may elapse. In this case, there is a possibility that the same communication log file (detected incident candidate) and processing results thereof arrive at the manual analysis unit 240 multiple times, and are stored in the storage device 241. For situations of this type, the communication log file and processing results thereof send last from the collector unit 210 are used as valid data. Note that the term valid data unit data subject to being sent to the terminal 300 and displayed in a display 330 (refer to FIG. 15), discussed below.

Figure 13:
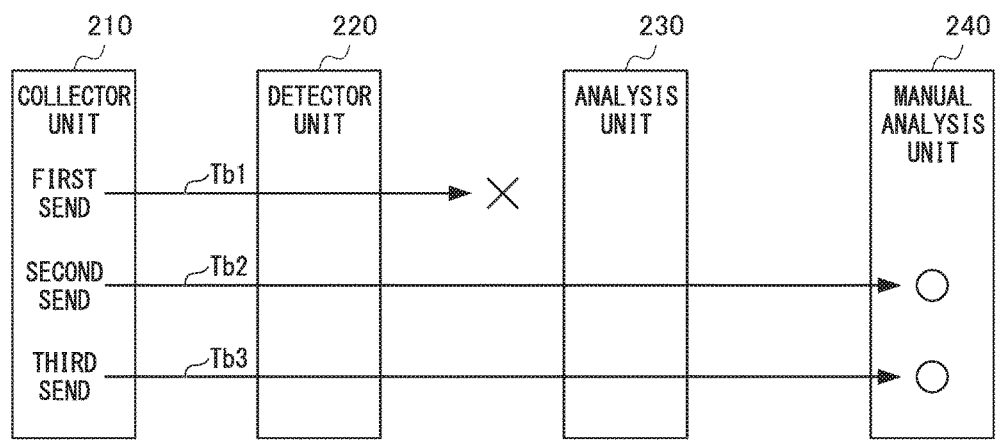
FIG. 13 is a diagram illustrating a different example of transmitting a communication log file in the present embodiment.

FIG. 13 is a diagram illustrating a different example of transmitting a communication log file in the present embodiment.

In FIG. 13, "x" denotes that a communication log file has been lost, while "o" denotes that a communication log file has reached the manual analysis unit 240. An arrow Tb1 indicates being sent a first time, an arrow Tb2 indicates being sent a second time, and an arrow Tb3 indicates being sent a third time. In the example illustrated in FIG. 13, a communication log file sent a second time arrives at the analysis unit 230 after a communication log file sent a third time arrives at the analysis unit 230, as discussed below.

In the example illustrated in FIG. 13, when sent out a first time, a communication log file does not arrive at the analysis unit 230 after processing by the detector unit 220, and is lost (refer to the arrow Tb1). When sent out a second time, the communication log file arrives at the manual analysis unit 240 without being lost (refer to the arrow Tb2). However, time is required for intermediate processes during the second time the communication log file is sent out. Therefore, before notification of the collector unit 210 is made by the manual analysis unit 240, the communication log file is sent out a third time (refer to the arrow Tb3). In addition, time is required to process the communication log file relating to being sent out the second time. The communication log file sent out a third time thus arrives at the manual analysis unit 240 before the communication log file send out the second time. In this case, results of processing of the communication log file sent out for the third time (final time) are handled as valid data, regardless of the order at which the results arrive at the manual analysis unit 240.

Note that, for cases like that described above, duplicate data relating to the same communication log file may arrive at the manual analysis unit 240 and be stored in the storage device 241. Data other than valid data (in the example illustrated in FIG. 13, valid data is that relating to the communication log file send out the second time) may be deleted, or left stored in the storage device 241.

Figure 14:
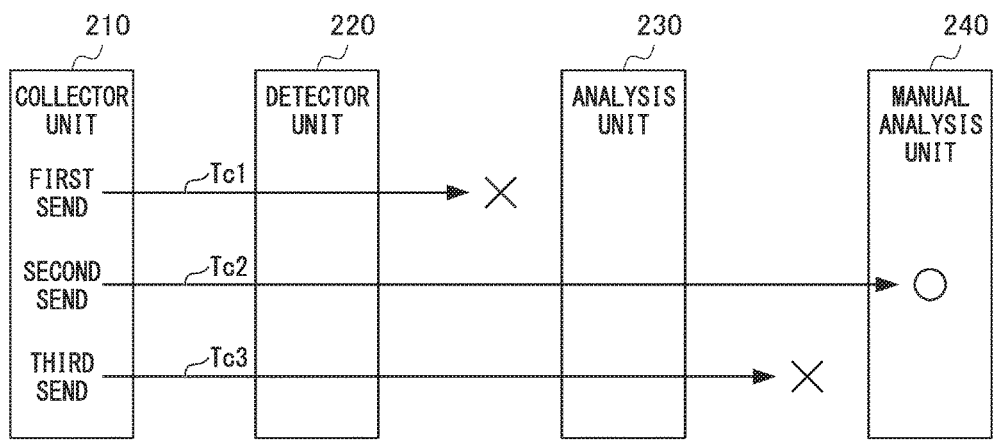
FIG. 14 is a diagram illustrating yet another example of transmitting a communication log file in the present embodiment.

FIG. 14 is a diagram illustrating yet another example of transmitting a communication log file in the present embodiment.

In FIG. 14, "x" denotes that a communication log file has been lost, while "o" denotes that a communication log file has reached the manual analysis unit 240. An arrow Tc1 indicates being sent a first time, an arrow Tc2 indicates being sent a second time, and an arrow Tc3 indicates being sent a third time.

As with the example illustrated in FIG. 13, there are times when a communication log file is resent before the communication log file sent previously arrives at the manual analysis unit 240. In cases such as these, the later sent communication log file could be lost en route. In the example illustrated in FIG. 14, a communication log file is resent (sent for a third time) before the same communication log file sent for a second time arrives at the manual analysis unit 240. However, the communication log file sent for the third time is lost and doesn't arrive at the manual analysis unit 240. In this case, only the communication log file send for the second time arrives at the manual analysis unit 240 and is stored in the storage device 241. Data relating to the communication log file sent for the second time is thus handled as valid data.

Note that the operations performed by the processor units described above are only examples of operations performed on a resent communication log file. There are no limitations on operations that may be performed on a communication log file. For example, in the present embodiment processing results from each processor unit are stored temporarily in a computer memory configuring each processor unit. However, the present embodiment is not limited to this type of configuration. As a separate example of the present embodiment, a configuration may also be employed where processing results from each processor unknit are stored in a database and managed therefrom. In this case processing results remain in the database for already completed processes, even if a communication log file is lost while being transferred between processor units. In this case, if a processor unit performs duplicate processing on a resent communication log file, the precision for detecting problem communications is impacted. It is necessary that duplicate processing results are allowed to remain.

As an example, when a resent communication log file is one that has already been processed in a certain processor unit, information on the currently existing processing results may be exchanged with information on the current processing results. That is, previous processing results relating to the communication log file are discarded. Further, as a separate example, when a resent communication log file is one that has already been processed in a certain processor unit, processing of the same communication log file when resent may be skipped, and the communication log file sent to a downstream processor unit.

Flag data or the like that shows a communication log file is being resent may also be added to the communication log file as information for distinguishing communications sent a first time and those that are resent. Information indicating the number of times a communication log file has been resent may also be added. If information added indicating the number of times a communication log file has been sent is included along with notification when sent from the manual analysis unit 240 to the collector unit 210, the number of times that the same communication log file has been sent can be confirmed based on the notification from the manual analysis unit 240, without counting the number of times that the same communication log file has been sent by the collector unit 210.

Functions of Terminal Device

Figure 15:
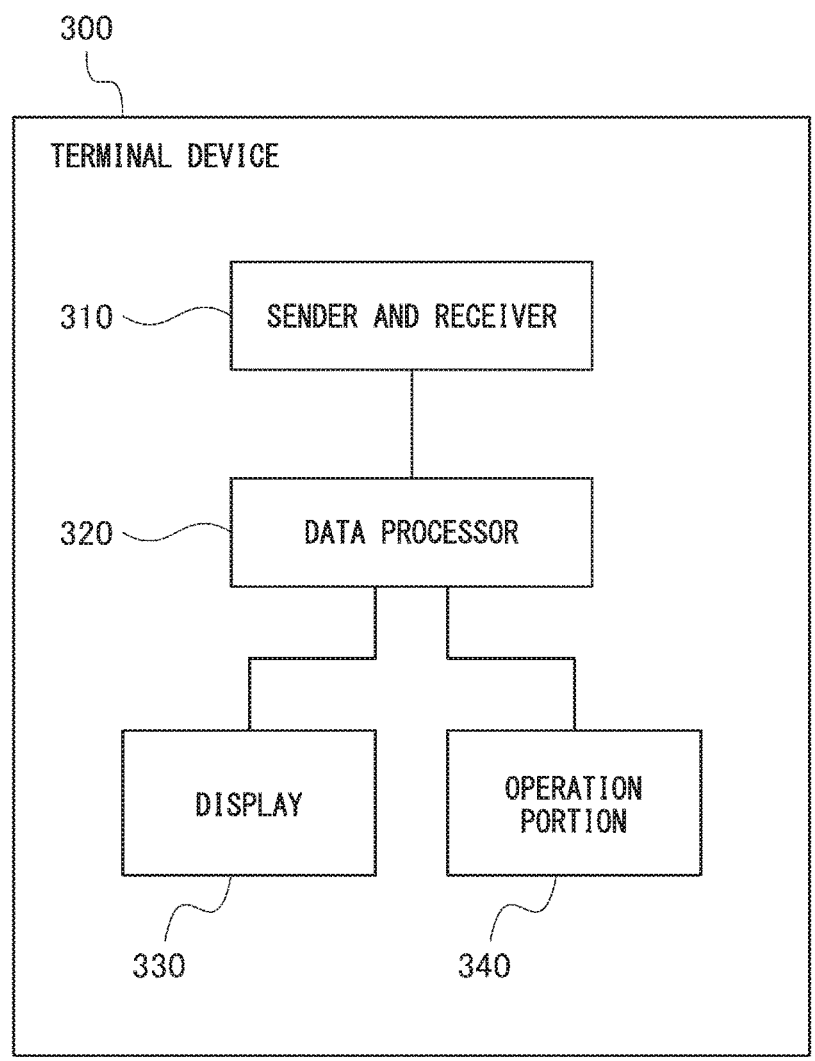
FIG. 15 is a diagram illustrating an example of the functional configuration of a terminal device illustrated in FIG. 1

FIG. 15 is a diagram illustrating an example of functional configuration of the terminal device 300.

In the example illustrated in FIG. 15, the terminal device 300 includes a sender and receiver 310, and a data processor 320. Further, the terminal device 300 includes a display 330 made from a liquid crystal display or the like, and an operation portion 340 made by using an input device such as a keyboard, a mouse, or the like.

The sender and receiver 310 is an interface for performing communication between with the manual analysis unit 240 of the monitoring subsystem 200. The sender and receiver 310 receives event, event sequence, and detected incident candidate information from the manual analysis unit 240. The information is obtained by processing performed by the detector unit 220 and the analysis unit 230. The sender and receiver 310 also receives results of analysis done by the analysis unit 230. Further, the sender and receiver 310 sends information input by operations of the operation portion 340 to the manual analysis unit 240 of the monitoring subsystem 200. In addition, when a problem communication is discovered as a result of analysis of monitoring target device 100 communications, the sender and receiver 310 sends information indicating that a problem communication has been discovered to a terminal device (not shown) operated by an operator of the monitoring target device 100.

The data processor 320 generates an analysis screen based on event, event sequence, and detected incident candidate information acquired by the sender and receiver 310 from the manual analysis unit 240 of the monitoring subsystem 200, and analysis results from the analysis unit 230. Further, thee data processor 320 displays the generated analysis screen in the display 330.

Figure 16:
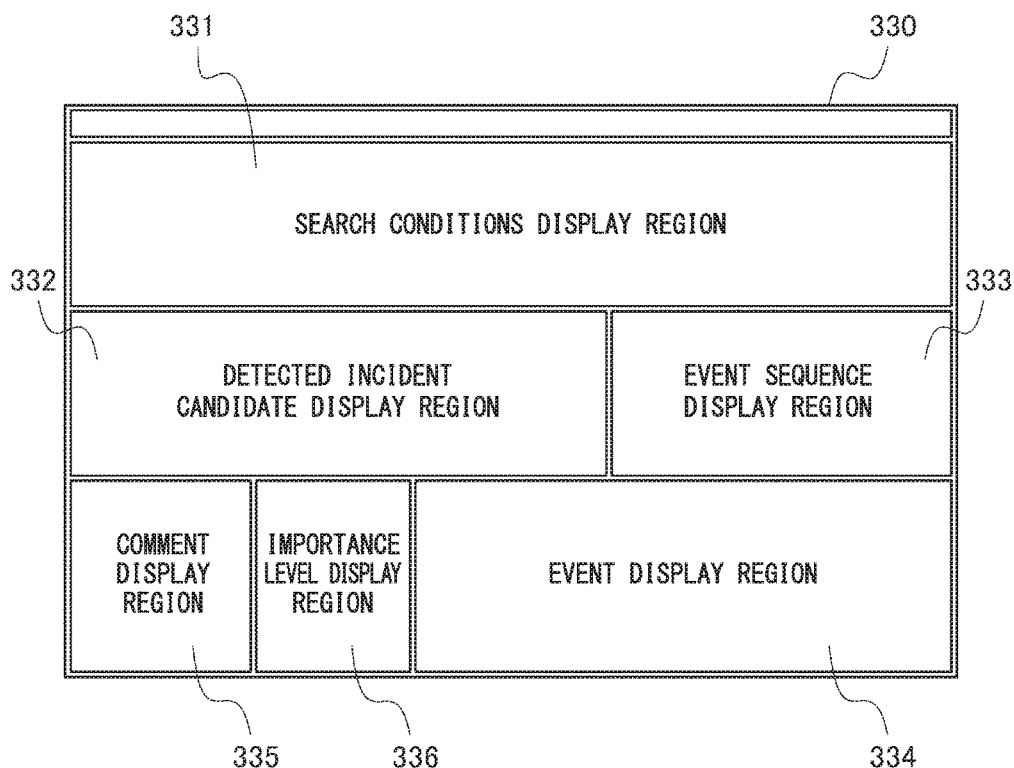
FIG. 16 is a diagram illustrating an example of the configuration of an analysis screen in the present embodiment.

FIG. 16 is a diagram illustrating an example of the configuration of an analysis screen in the present embodiment.

In the example illustrated in FIG. 16, an analysis screen displayed in the display 330 is configured by six display regions: a search condition display region 331, a detected incident candidate display region 332, an event sequence display region 333, an event display region 334, a comment display region 335, and an importance level display region 336.

Detected incident candidates and the like are displayed in the detected incident candidate display region 332. Search conditions thereof are displayed in the search condition display region 331. The search conditions may be set initially, for example, to arbitrary conditions. Further, the search conditions may also be set by an analyst inputting desired search conditions through operating the operation portion 340. Note that detected incident candidates having one event sequence or having only one event are also included as detected incident candidates that become search targets. Further, single events removed without performing analysis, based on a conditional relationship found by the individual analysis processor 230a of the analysis unit 230, can be set as search targets. Namely, as detected incident candidates made from one event.

Detected incident candidates searched under the search conditions displayed in the search condition display region 331, and processing results thereof by the analysis unit 230 of the monitoring subsystem 200, are displayed in the detected incident candidate display region 332.

Event sequences included in detected incident candidates displayed in the detected incident candidate display region 332 (that is, those searched under search conditions specified in the search condition display region 331), and processing results thereof by the analysis unit 230 of the monitoring subsystem 200, are displayed in the event sequence display region 333.

Events included in detected incident candidates displayed in the detected incident candidate display region 332 (that is, those searched under search conditions specified in the search condition display region 331), and processing results thereof by the analysis unit 230 of the monitoring subsystem 200, are displayed in the event display region 334.

Comments input by an analyst operating the operation portion 340 are displayed in the comment display region 335. Specifically, an analyst evaluation or other comment regarding a communication of thee monitoring target device 100 may be input, for example.

Evaluation levels for performing evaluation of detected incident candidates displayed in the detected incident candidate display region 332 (that is, those searched under search conditions specified in the search condition display region 331) are displayed in the importance level display region 336. The term evaluation is an importance value graded in advance depending upon necessary responses to communications specified by detected incident candidates. For example, whether or not an immediate response must be taken, whether or not continued detection and evaluation of similar communications is necessary, and the like. The importance level display region 336 becomes an input interface for receiving importance level selection by an analyst. An analyst performs evaluation of a searched detected incident candidate by selecting one importance level displayed in the importance level display region 336.

An analyst evaluates (manually analyzes) communications of the monitoring target device 100 based on detected incident candidates, event sequences, and events. The detected incident candidates, event sequences, and events are searched based on search conditions initially displayed in the search condition display region 331 of the display 330, or based on search conditions input by the analyst operating the operation portion 340. When a problem communication is discovered, the operator operates the operation portion 340 to input a comment and an importance level depending upon the content of the communication (problem content). An operator of the monitoring target device 100 is notified through the sender and receiver 310.

Note that for communications determined to be unauthorized communications (such as attacks or unauthorized information leaks) by collation with a list in the analysis unit 230, and for communications confirmed to be unauthorized communications by analysis in the analysis unit 230, such communications may also be targets for notification of an operator of the monitoring target device 100. Evaluation by an analyst is not necessary.

Hardware Configuration Example

Figure 17:
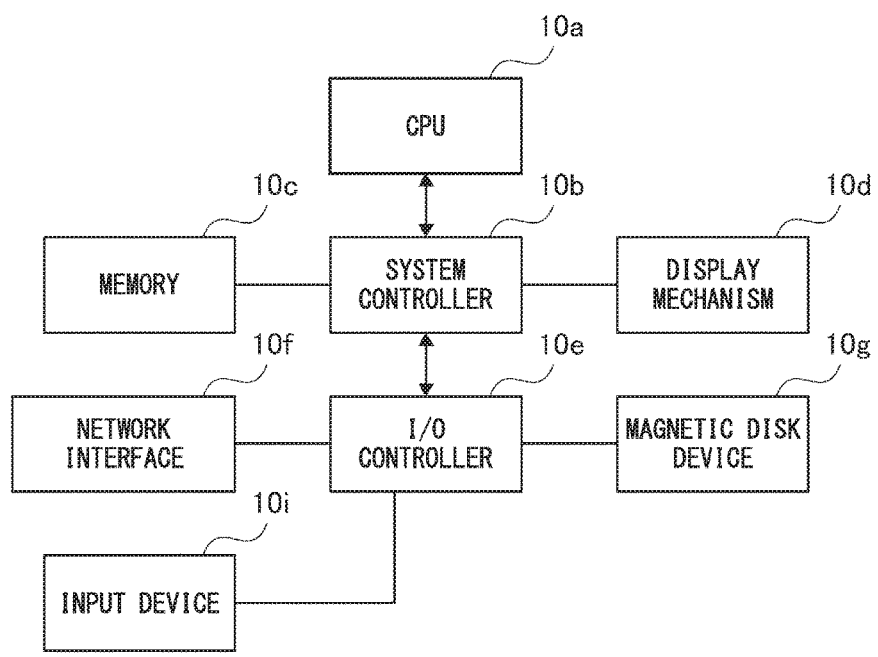
FIG. 17 is a diagram illustrating an example of the preferred hardware configuration for configuring each server and terminal device in a monitoring subsystem of the present embodiment.

FIG. 17 is a diagram illustrating an applicable hardware (computer) configuration example for configuring each processor unit of the monitoring subsystem 200 and the terminal device 300 of the present embodiment.

A computer illustrated in FIG. 17 includes a CPU (central processing unit) 10a that is a computation unit, and a memory 10c that is a main memory unit. Further, the computer illustrated in FIG. 17 includes a magnetic disk device (Hard Disk Drive, HDD) 10g, a network interface 10f, a display mechanism 10d containing a display device, and an input device 10i such as a keyboard, mouse, or the like as external devices.

In the configuration example illustrated in FIG. 17, the memory 10c and the display mechanism 10d are connected to the CPU 10a through a system controller 10b. Further, the network interface 10f, the magnetic disk device 10g, and the input device 10k are connected to the system controller 10b through an I/O controller 10e. Each constitutive element is connected by a bus such as a system bus, input bus, or the like.

FIG. 17 is only an illustrative example of a preferred computer hardware configuration for applying the present embodiment. The present embodiment can be applied widely to information processing devices capable of detecting unauthorized communications or problem communications by acquiring and processing in real time a communication log file from the monitoring target device 100. That is, configurations for realizing the present embodiment are not limited to the configuration illustrated in FIG. 17.

An OS program and application program are stored on the magnetic disk device 10g in FIG. 17. By reading in the programs into the memory 10c and executing the programs in the CPU 10a, each of the processor units 210 to 240 of the monitoring subsystem 200, and each function of the terminal device 300 in the present embodiment, are realized.

INDUSTRIAL APPLICABILITY

The present invention may be applied to a log analysis system.

EXPLANATION OF SYMBOLS

100 Monitoring target device
110 Detector device
111 Sensor
112 Sensor manager
120 Log manager subsystem
121 log acquisition agent
200 Monitoring subsystem
210 Collector unit

220 Detector unit
230 Analysis unit
240 Manual analysis unit
300 Terminal device

What is claimed is:

1. A log analysis system configured to analyze detection logs detected in a monitoring target system, the log analysis system comprising:
   an acquisition device configured to detect detection target processes performed in the monitoring target system, and acquire detection logs, where the detection logs are logs generated by detection target processes; and
   at least one processor device configured to process the detection logs acquired by the acquisition device,
   wherein the at least one processor device comprises a plurality of processing blocks configured to perform processing of the detection logs in sequence, the plurality of processing blocks is configured to perform processing while sending the detection logs in order from a most-upstream processing block to downstream processing blocks of the plurality of processing blocks;
   wherein a most-downstream processing block of the processor device is configured to notify the most-upstream processing block that the most-downstream block received the detection logs,
   wherein the plurality of processing blocks further includes one or more intermediate processing blocks that are more downstream than the most-upstream block and are more upstream than the most-downstream processing block, the one or more intermediate processing blocks are configured not to notify the most-upstream processing block that the intermediate processing block received the detection logs, and the one or more intermediate processing blocks are configured not to notify any adjacent processing block that the intermediate processing block received the detection logs, and
   wherein the most-upstream processing block resends the downstream processing blocks a detection log that the most-upstream processing block failed to confirm that the most-downstream processing block has received, on the basis of a notification from the most-downstream processing block.

2. The log analysis system according to claim 1, wherein the most-upstream processing block is configured to stop resending the detection log in case that after having sent the detection log a predefined number of times, the most-upstream processing block failed to confirm that the most-downstream processing block has received, on the basis of a notification from the most-downstream processing block.

3. The log analysis system according to claim 1, wherein the most-upstream processing block is configured to add the detection log with an identifying information to identify whether or not the detection log is to be resent, before sending the detection log with the identifying information to the downstream processing blocks.

4. The log analysis system according to claim 1, wherein the most-upstream processing block is configured to add the detection log with an information indicating a number of times the detection log has been sent, before sending the detection log with the information to the downstream processing blocks.

* * * * *